July 13, 1937.    H. A. HAYDEN    2,086,801
PROCESS OF MAKING TAPPET SCREWS
Original Filed Aug. 15, 1927

INVENTOR
Howard A. Hayden
BY
Swan, Fryer, & Hardesty
ATTORNEYS.

Patented July 13, 1937

2,086,801

UNITED STATES PATENT OFFICE 2,086,801

PROCESS OF MAKING TAPPET SCREWS

Howard A. Hayden, Detroit, Mich.

Original application August 15, 1927, Serial No. 212,889. Divided and this application July 25, 1932, Serial No. 624,457

1 Claim. (Cl. 148—10)

The present invention relates to adjusting screws such as valve tappet adjusting screws and to a process of making same.

Among the objects of the invention is a screw of this type which shall have an extremely hard wearing portion supported in a softer and tougher matrix portion.

Another object is a method of hardening such wearing portions quickly, easily and economically without affecting the toughness of the adjacent portions.

Other objects will readily occur to those skilled in the art upon reference to the following description and the accompanying drawing in which:—

Figure 1:
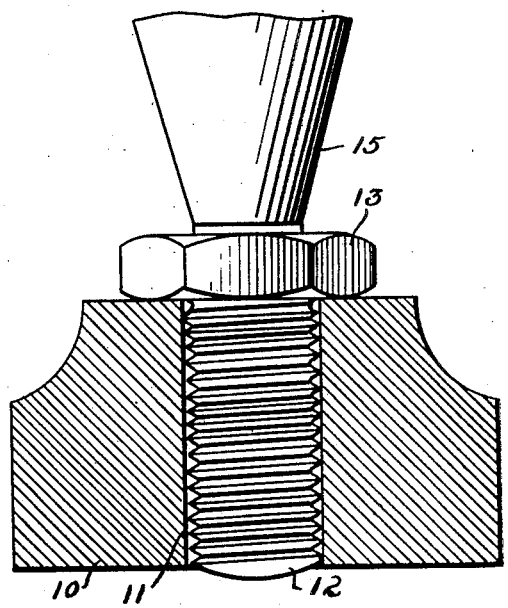
Fig. 1 is a more or less conventional showing of the apparatus used in the process.

In the drawing, a suitable holder 10, is provided with an opening 11 into which the threaded shank of a screw 12 may drop easily with its head 13 resting upon the upper surface of the holder. This holder 10 will be connected electrically so as to form one electrode of a spot welding couple, the other electrode being shown at 15. The latter will of course be provided with the usual means for lifting it or pressing it down upon the screw 12 and with suitable electric connection to a source of current (not shown).

Figure 2:
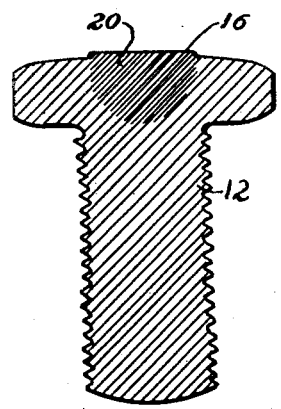
Fig. 2 is an illustrative section through a treated screw.

The screw 12, as prepared for the present operation, will be formed in the usual manner and threaded as shown but will be formed of metal capable of being hardened, preferably steel rather high in carbon or other hardening constituents. It will also be formed with a small raised flat portion 16 in the center of the head as shown in Fig. 2. The area of this portion 16 is preferably about that of the desired wearing spot and is also about the same as the area of the lower end of electrode 15 and of the same shape.

Figure 3:
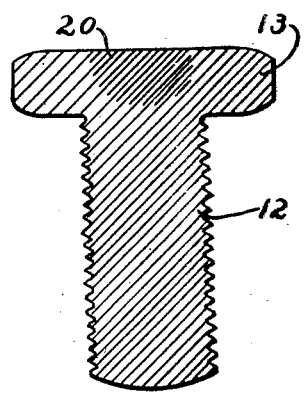
Fig. 3 is a similar section through a finished screw.

In carrying out the method, a screw 12 is placed in holder 10 and the electrode 15 pressed down tightly upon portion 16 while the current is being passed therethrough. This causes a local heating of the screw head and when the required temperature has been reached thereby, the screw is removed and immediately quenched. The heating is localized by providing the reduced portion 16 and as the heating is also quite rapid, the major portion of the screw remains comparatively cool. Quenching, therefore, causes only a local hardening which extends only to about the sectional area shown by the shading 20 in Figs. 2 and 3.

After quenching, the raised portion 16 is ground off as a finishing step leaving the head 13 with a hard spot in its center. As stated this hard spot extends for a short distance into and merges into the matrix portion of unhardened tough metal.

This application is a division of my application Serial No. 212,889, filed August 15, 1927, "Tappet screw and process of making the same".

Now having described the invention and the preferred embodiment thereof, it is to be understood that the said invention is to be limited, not to the specific details herein set forth, but, only by the scope of the claim which follows:—

What I claim is:—

The herein described process of hardening the impact portion of the head of a tappet screw, which consists in subjecting the head to the heating action of an electric current directed to flow through the head between the central zone of the upper surface of the head and a lower portion of the head of greater area than said central zone, in discontinuing the passage of the current through the head upon the heating to a critical temperature of the central zone of the upper surface of the head and a small portion of the head located immediately below said central zone and spaced from the lower and lateral sides of the head, and in quenching the tappet screw, whereby said small portion of the head and the upper surface of such portion will be made harder and supported by the surrounding and underlying soft and tough portions of the head.

HOWARD A. HAYDEN.